United States Patent [19]

Coombes et al.

[11] Patent Number: 4,562,226

[45] Date of Patent: Dec. 31, 1985

[54] COATING COMPOSITIONS

[75] Inventors: Norman A. Coombes, Maidenhead; Michael R. Wilkinson, Slough; Charles W. A. Bromley, Bourne End, all of England

[73] Assignee: Imperial Chemical Industries PLC, London, England

[21] Appl. No.: 566,419

[22] Filed: Dec. 28, 1983

[30] Foreign Application Priority Data

Jan. 12, 1983 [GB] United Kingdom ................. 8300773

[51] Int. Cl.$^4$ ...................... C08F 222/20; C08L 35/02
[52] U.S. Cl. ..................................... 524/767; 524/831; 524/833; 524/458; 524/460
[58] Field of Search ............... 524/833, 458, 460, 831, 524/767

[56] References Cited

U.S. PATENT DOCUMENTS

| 3,708,445 | 1/1973 | Junas | 526/320 |
| 3,759,861 | 9/1973 | Shimokawa | 524/458 |
| 4,138,381 | 2/1979 | Chang | 524/833 |
| 4,265,977 | 5/1981 | Kawamura | 524/458 |
| 4,322,328 | 3/1982 | Graetz | 524/458 |
| 4,328,149 | 5/1982 | Morse | 524/458 |
| 4,384,096 | 5/1983 | Sonnabend | 526/313 |
| 4,409,355 | 10/1983 | Heimberg | 524/458 |
| 4,453,261 | 6/1984 | Waite | 524/458 |
| 4,476,269 | 10/1984 | Wilk | 524/555 |

FOREIGN PATENT DOCUMENTS

| 0080431 | 7/1978 | Japan | 524/458 |
| 2039497A | 8/1980 | United Kingdom . | |

Primary Examiner—C. Warren Ivy
Attorney, Agent, or Firm—Cushman, Darby & Cushman

[57] ABSTRACT

Aqueous compositions suitable for forming on a substrate a temporary protective coating, which can subsequently be removed by treatment with an aqueous alkaline solution, comprise a sterically stabilized dispersion in an aqueous medium of particles of size range 0.1–10 $\mu$m of a polymer derived from monomers including at least one acrylic monomer and from 5% to 40%, based on the total weight of monomers, of an ethylenically unsaturated monocarboxylic acid, or an equivalent proportion of an unsaturated polycarboxylic acid.

12 Claims, No Drawings

COATING COMPOSITIONS

This invention relates to compositions suitable for the temporary protection of the surface of an article through the deposition on the surface of a coating which can subsequently be readily removed therefrom when required by a simple dissolution operation.

It is already known to provide a temporary protection for painted or polished metal manufactured articles against weathering, contamination from the atmosphere, chemical attack or accidental damage during handling and storage, by applying to the existing painted or polished surface a further coating which can easily be removed later without deleterious effect upon the surface in question. Such protection is particularly desirable in the automobile industry, where a newly completed vehicle may have to be stored out of doors for a period and to be driven or transported some distance before delivery to the premises of a dealer, who will naturally be concerned that the bodywork can then be presented in pristine condition. A commonly used expedient is to coat the newly painted body with a wax, which provides a weatherproof and to some extent damage-resistant layer, but its subsequent removal requires the use of a solvent, optionally in conjunction with a steam jet, thus involving flammability and/or toxicity hazards and possibly also calling for special equipment.

In order to overcome these disadvantages, an alternative type of temporary protective coating which is widely used is one based upon a synthetic polymer (often of the acrylic type) containing a substantial proportion of acid groups, especially carboxyl groups. Removal of such a coating when desired can be achieved simply by treatment with dilute alkali, followed by water washing. In order to avoid the use of organic solvents for the initial application of the coating, it is customary to employ the polymer in aqueous latex form, obtained by the conventional aqueous emulsion polymerisation route.

These aqueous latex polymers are characteristically charge-stabilised, that is to say, the polymer particles in dispersion in the aqueous medium are prevented from flocculating or aggregating by the presence on their surfaces of electrical charges (derived from the ionisable initiator and/or surfactant used in the polymerisation of the monomers). We have now found that temporary protective coatings having superior properties to those derived from such latex polymers can be produced from sterically stabilised aqueous polymer dispersions of the type described in British Patent Specification No. 2039497A, in which the polymer contains a certain defined level of carboxyl groups.

According to the present invention there is provided an aqueous composition suitable for the production upon a substrate of a temporary protective coating which can subsequently be removed by treatment with an aqueous alkaline solution, the composition comprising a sterically stabilised dispersion in an aqueous medium of particles of a size in the range 0.1 to 10 microns of a polymer derived from a monomer mixture comprising at least one acrylic monomer and from 5% to 40%, based on the total weight of the monomer mixture, of an ethylenically unsaturated monocarboxylic acid, or a proportion equivalent thereto, in terms of carboxyl group content, of an ethylenically unsaturated polycarboxylic acid.

By "acrylic monomer" we mean an alkyl ester of acrylic acid or methacrylic acid, such as methyl methacrylate, ethyl methacrylate, butyl methacrylate, lauryl methacrylate, ethyl acrylate, butyl acrylate, hexyl acrylate, n-octyl acrylate, 2-ethylhexyl acrylate and lauryl acrylate; we also include under this term the nitriles and amides of acrylic acid and methacrylic acid.

Suitable ethylenically unsaturated monocarboxylic acids include acrylic acid and methacrylic acid; suitable polycarboxylic acids include maleic acid and itaconic acid.

The monomer mixture from which the disperse polymer is derived may also include monomers, free from carboxylic acid groups, which are not of the acrylic type, for example vinyl aromatic compounds such as styrene and vinyltoluene, and vinyl esters of organic and inorganic acids such as vinyl acetate, vinyl propionate, vinyl chloride and vinylidene chloride.

The monomer mixture preferably contains from 5% to 25%, and more preferably from 10% to 20%, based on the total weight of monomer, of an ethylenically unsaturated monocarboxylic acid, or a corresponding proportion of an unsaturated polycarboxylic acid. Where the unsaturated carboxylic acid is methacrylic acid, the latter range corresponds to a polymer acid value of from 65 to 130 mg KOH/g.

The constituents of the monomer mixture and their relative proportion should be so chosen, following principles which are well known to those skilled in the art, that the derived disperse polymer exhibits satisfactory film coalescence properties under the conditions of application of the coating composition to the substrate. These conditions may vary according to the nature of the substrate to be treated, e.g. in some cases the substrate may be at a temperature above ambient immediately following a final fabrication step, and this will assist film coalescence. In other cases, the coalescence of the disperse polymer may be promoted if necessary by the incorporation in the composition of a conventional coalescing solvent.

The sterically stabilised dispersion of the polymer may be obtained, as described in U.S. Pat. No. 4,322,328, by free radical-initiated polymerisation of the monomer mixture in an aqueous medium as hereinafter defined at a temperature which is at least 10° C. higher than the Tg (glass-rubber transition temperature) of the polymer, in the presence in the aqueous medium as steric stabiliser of a block or graft copolymer which contains in the molecule a polymeric component of one type which is solvatable by the aqueous medium and a polymeric component of another type which is not solvatable by the aqueous medium and is capable of becoming associated with the polymer particles formed, the concentration of free monomer in the polymerisation mixture being maintained throughout at a level such that at no time does the free monomer form a separate phase, the total amount of monomer mixture polymerised being such that the resulting dispersion contains at least 20% by weight of polymer. Usually, for the purposes of the present invention, the amount of monomer will be such that the dispersion contains in the region of 40–50% by weight of polymer.

The aqueous medium employed in the above-described polymerisation procedure is a mixture comprising (a) at least 30% by weight of water and (b) not more than 70% by weight of a second constituent which is miscible with water, the nature and proportion of the second constituent being such that the aqueous medium as a whole is capable of dissolving the monomer mixture to the extent of at least 3% by weight but is a non-solvent for the polymer formed. The use of the term "aqueous medium" does not imply that water should always be the major constituent of the medium in which the monomer mixture is polymerised; however, as high a proportion of water as possible is employed, consistent with the aqueous medium being capable of dissolving the monomer mixture at least to a sufficient extent to avoid the existence of a separate monomer phase. In practice, water will usually constitute 30–70% by weight of the aqueous medium.

Substances which are suitable as the second, water-miscible constituent of the aqueous medium include in particular the lower alcohols; the preferred alcohol for the purposes of the present invention is ethanol.

Preferably, the temperature of polymerisation of the monomer mixture is at least 20° C., more preferably at least 30° C., higher than the Tg of the polymer which is formed.

Further details of the above-outlined polymerisation procedure are given in the afore-mentioned U.S. Pat. No. 4,322,328, including in particular details of the block or graft copolymer stabiliser which is required to be present during the polymerisation in order that the necessary steric stabilisation of the polymer particles formed may be effected. Preferably the stabiliser is, as there described, formed in situ during the polymerisation by introducing into the reaction mixture, before polymerisation begins, a "stabiliser precursor" which contains in the molecule a polymeric component which is solvatable by the aqueous medium and an unsaturated grouping which is capable of copolymerising with the monomer mixture. Particularly suitable stabiliser precursors are the acrylic or methacrylic esters of polyethylene glycols, or their monoalkyl ethers, of molecular weight in the range 1500–4000. The proportion of stabiliser precursor used is typically in the range 0.5–20%, more especially 2–10%, by weight of the polymer content of the dispersion being made. The copolymerisation of the precursor with a minor proportion of the monomer mixture, during the polymerisation of the latter, leads to the production of the block or graft copolymer stabiliser having the characteristics hereinabove defined.

Depending upon the particular monomers being polymerised and the composition of the aqueous medium employed, the product of the polymerisation procedure may contain some polymer in solution in the medium in addition to the polymer in disperse particle form.

After the completion of the polymerisation, the product may if desired be submitted to distillation to remove some of the second constituent (usually ethanol) of the aqueous medium. Conveniently, for the purposes of the present invention, one-third to one-half of the alcohol may be stripped off. For the formulation of the coating composition, the dispersion is then preferably diluted with water, optionally also with a co-solvent such as isopropyl alcohol, so as to bring the polymer solids content into the region of 25% by weight based on the total composition. There may advantageously be added to the diluted dispersion a small proportion (0.5–5.0%) based on the total composition, of a surfactant, to assist the composition in wetting out the surface to which it is subsequently applied. The surfactant may, for example, be of the anionic type, e.g. sodium dioctylsulphosuccinate, or of the non-ionic type, e.g. a condensate of nonylphenol with ethylene oxide. There may also optionally be added, as already mentioned, a coalescing aid, such as propylene glycol monomethyl ether or decanol, to promote the formation of a continuous film upon the substrate. Other conventional additives which may be incorporated include slip aids, such as polyethylene wax dispersions, whereby the mar resistance of the temporary coating may be improved, flow aids, plasticisers, fillers, beads, extenders, pigments or dyes. If desired, the composition may contain additionally a proportion of a conventional charge-stabilised polymer latex, but the advantages to be secured from the invention are thereby diminished.

The coating composition may be applied to the substrate by any conventional method, such as spraying, (including airless spraying), brushing, dipping, roller coating and curtain coating. The applied material is then allowed to dry, either spontaneously at room temperature or under moderately forcing conditions in a current of warm air. Coalescence and the development of a satisfactory water-resistant film are found to occur more rapidly with the compositions of the invention than with the prior art compositions based on charge-stabilised latices. This advantage is of particular significance when the compositions are used for temporary protection of car bodies that are placed out of doors and are liable to be subjected to rain very shortly after coating.

Stripping of the coating from the substrate when required is easily accomplished by application of an aqueous alkaline solution. The concentration of solution necessary depends upon a number of factors, such as the temperature of removal, the particular alkali used, the acid group content of the latex polymer, the thickness of the film and the extent to which the film has aged or weathered prior to removal. The optimum removal conditions may readily be established by simple experiment, but for general guidance it can be stated that, for the removal of coatings based on polymers containing in the region of 10–20% by weight of carboxyl group-bearing monomers, 1% by weight, solutions of sodium hydroxide, ammonium hydroxide or amines such as triethanolamine or dimethylaminoethanol are satisfactory. For effective removal at ordinary temperatures, it is preferred to add a small proportion (e.g. 2–4% by weight) of alcohol such as butanol or isobutanol to the stripping solution, but if stripping is carried out at moderately elevated temperatures, e.g. 40° C., this is not necessary. Rather milder alkalies are satisfactory also at moderately elevated temperatures, for example a 1% concentration of sodium carbonate can be used at about 40° C., and a similar concentration of sodium bicarbonate at rather higher temperatures. The stripping solution may conveniently be applied by spraying, particularly since warm application can be achieved by the use of a steam jet. A more economical use of the stripping solution can be achieved by thickening it by the addition of a suitable agent, such as a cellulose ether, and then applying it to the substrate as a paste. After the latter has remained in contact with the coating for a sufficient length of time, the substrate may be washed clean in a current of water.

If desired, the carboxylic acid groups in the polymer of the dispersion may be neutralised wholly or in part by addition to the dispersion or coating composition of a water-soluble amine. Substantial neutralisation in this way has the advantage that it avoids the occurrence of flash rusting when the composition is applied to a bare steel article, but it tends to extend the drying time of the composition. Preferably only sufficient amine is added to bring the pH of the composition (which may range from 3 to 6 after manufacture) to a value of 6–7. It is preferred to use a volatile amine, such as ammonia or dimethylaminoethanol, which is released as the newly applied coating dries. The ease of removal of the coating by aqueous alkaline stripping solution is not significantly affected by such neutralisation.

As already indicated, the compositions of the invention are especially useful for the application of temporary protective coatings to automobile bodies, as well as to industrial vehicles and items of agricultural equipment. They are also valuable for such protection of manufactured articles having polished metal surfaces, such as stainless steel sink units and other articles made from copper, brass or aluminium, and of plastic-faced working surfaces, plastic baths or sinks and glassware. They may further be used for protecting metal or plastic panels during fabrication and assembly operations. The coatings so obtained are significantly harder than the known wax temporary coatings.

An advantage of the compositions per se (as distinct from the derived coatings) over those of the prior art based on charge-stabilised aqueous polymer latices is that they are stable towards alternate freezing and thawing, even at low pH values. Accordingly storage of the compositions need not be so carefully controlled.

The invention is illustrated by the following Examples, in which parts and percentages are by weight.

In the Examples which follow, reference is made to the procedure described in Example 1 of British Patent Specification No. 2 039 497A. The procedure described in that Example is as follows:

A. Preparation of Graft Copolymer Stabilizers

A mixture of methoxy(polyethylene glycol) molecular weight about 2000 (2000 parts), toluene (800 parts), pyridine (800 parts), and 2:4-dimethyl-6-tert butylphenol (1.5 parts) was heated to reflux under a nitrogen blanket and any water being azeotroped was removed. This being accomplished, methacrylic anhydride (188 parts) was added and the temperature of the mixture was maintained at about 90° C. for three hours. On cooling, a granular mass was formed and a large excess of medium boiling point aliphatic hydrocarbon was added to complete the precipitation. (The actual choice of aliphatic hydrocarbon was not important). The product was filtered off, washed with aliphatic hydrocarbon (boiling range 60°–80° C.) and dried under vacuum. The product was essentially the methacrylate ester of methoxy (polyethylene glycol), containing little or no unreacted material.

A similar result was obtained of the pyridine was replaced by 2:6-lutidine and the methacrylic anhydride was replaced by methacrylyl chloride (128 parts), a warm filtration step being incorporated at the end of the reaction period to remove lutidine hydrochloride.

A mixture of the methoxy(polyethylene glycol) methacrylate thus prepared and the appropriate other monomers in the desired ratio as indicated in detail in the Example below, the total quantity of monomers being 300 parts, azo diisobutyronitrile (3.8 parts), toluene (202 parts), ethanol (202 parts), and water (45 parts) was refluxed for 2½ hours. A further quantity of azodiisobutyronitrile (2.2 parts) was added and the mixture was refluxed for a further 2 hours. The product was a 40% solution of the desired copolymer.

EXAMPLE 1

Preparation of latex of a thermoplastic-type polymer having a theoretical Tg of 4° C. in 4:1 water:ethanol mixture at reflux temperature In this Example there was first prepared a "seed" dispersion of a copolymer of methyl methacrylate and butyl acrylate by polymerization of the monomers in a water-ethanol mixture in the presence of methoxy(polyethylene glycol) methacrylate functioning as a "precursor" for a steric stabilizer. A dispersion polymerisation of methyl methacrylate and butyl acrylate was then carried out according to the process of the invention, in the presence of the seed dispersion and a pre-formed graft copolymer.

A mixture of methoxy(polyethylene oxide) methacrylate (3.7 parts) prepared by the method described above and having a molecular weight of about 2000, ethanol (12.5 parts), methyl methacrylate (3.7 parts) butyl acrylate (3.7 parts) and azodiisobutyronitrile (0.15 part) was added slowly over a 1 hour period to a refluxing mixture of water (340 parts) and ethanol (85 parts). The resulting mixture was refluxed for a further hour, giving a composition which was opalescent in appearance. To this composition at reflux temperature (84° C.) was added slowly during 2.5 hours a mixture of methyl methacrylate (100 parts), butyl acrylate (100 parts), azodiisobutyronitrile (3 parts) and a 11.6% solution of a graft copolymer (206 parts). The mixture was heated for one hour more to give a 27% solids content polymer dispersion with a particle size in the range of 0.05–0.5 micron. The Tg of the main copolymer was 4° C.

The graft copolymer was prepared by the general method described above from the methacrylate of methoxy (polyethylene oxide) (molecular weight 2000), methyl methacrylate and butyl acrylate in the weight ratios 5:3:2, the molecular weight of the acrylic portion being about 10,000. The solution of copolymer was diluted with ethanol to the stated concentration.

EXAMPLE 1

Preparation of Latex I

A sterically stabilised acrylic copolymer latex was prepared, following the general procedure as described in Example 1 of British Specification No. 2 038 497A.

| The ingredients employed were as follows:- | |
|---|---|
| Demineralised water | 28.49 parts |
| Industrial methylated spirit | 29.07 parts |
| Methoxy (polyethylene oxide) methacrylate, mol. wt. 2000 (stabiliser precursor) | 2.49 parts |
| Solvent for precursor (mainly toluene) | 0.55 parts |
| Azodiisobutyronitrile | 0.78 parts |
| Methyl methacrylate | 10.61 parts |
| Butyl acrylate | 20.58 parts |
| Methacrylic acid | 7.46 parts |
| | 100.00 |

The resulting latex polymer had the monomer composition methyl methacrylate 27.45%, butyl acrylate 53.25% and methacrylic acid 19.3% (based on total monomers). Following the latex preparation, 16.2% by weight of the solvent (mainly ethanol) initially present was distilled off and was replaced by 19.9% by weight of water, giving a final measured solids content of 40.4% by weight. This product was of a viscosity which enabled it to be filtered readily in order to remove traces of coarse suspended matter.

Preparation of Coating Composition 1

A sprayable coating formulation was obtained by adding to this latex water, a 75% solution of sodium dioctylsulphosuccinate in industrial methylated spirit, and dimethylaminoethanol in proportions such that the final composition contained 25% by weight of latex polymer, 0.375% by weight of sodium dioctylsulphosuccinate and 0.3% by weight of dimethylaminoethanol. The pH of the composition was in the range 6.5-7.0 and it had a density of 1.02 g/cc. The composition exhibited excellent freeze-thaw stability, being unaffected by seven successive cycles down to a minimum of −25° C. No separation of any of the ingredients occurred on storage at 40° C. for a period of 2 months.

The composition was applied to a steel panel coated with a thermosetting acrylic top-coat paint, using two double passes from a conventional air-atomisation spray gun in a spray booth maintained at 27° C. The temporary coating so obtained had a dry film thickness of about 10 microns and was well coalesced. The film was touch-dry in about 1 minute and showed good water resistance after 2 minutes; this was assessed by observing any removal of, or damage to, the film after it had been subjected for 1 minute to a current of tap water from an orifice of internal diameter 10 mm, the flow rate being 2 liters per minute and the panel under test being held at an angle of 45° to the current of water with the point of impingement of the water on the panel 15 cm below the orifice. On ageing at room temperature the coating attained good resistance to scratching and abrasion and was much tougher than a conventional wax protective film.

After 7 weeks' weathering (external exposure in a light industrial environment) the temporary protective coating was still fully intact and hard and exhibited the same medium degree of gloss as it did immediately after application.

Removal of the temporary coating from the panel was effected by pouring or spraying on to it at room temperature an aqueous solution containing 1% by weight of sodium hydroxide, 2% by weight of isobutanol and 1% of a cellulose ether as thickener. After this solution had remained in contact with the coating for 15 seconds, the panel was washed in a jet of cold water. Inspection of the panel after drying showed complete removal of the temporary coating and absence of any damage to the acrylic top-coat.

When the above-described removal solution was replaced by one containing 1% by weight of dimethylaminoethanol, 4% by weight of isobutanol and 1% of cellulose ether, the temporary coating was again satisfactorily removed but a rather longer period of contact of the solution with the coating was necessary.

Alternatively, the temporary coating could be completely removed, with no damage to the top-coat, by spraying it for 30 seconds with a solution at 40° C. containing 1% by weight of sodium carbonate and 0.04% by weight of dimethylcocoamine oxide surfactant.

EXAMPLES 2-9

(A) Preparation of Latex II

A sterically stabilised acrylic copolymer latex was prepared, following the general procedure described in Example 1 of British Specification No. 2 039 497A, using the following ingredients:

| | |
|---|---|
| Demineralised water | 26.94 parts |
| Industrial methylated spirit | 25.29 parts |
| Methoxy (polyethylene oxide) methacrylate, mol. wt. 2000 (30.8% solids solution in 80/20 water/methylated spirit) | 8.12 parts |
| Azodiisobutyronitrile | 0.78 part |
| Methyl methacrylate (MMA) | 10.67 parts |
| Butyl acrylate (BA) | 20.70 parts |
| Methacrylic acid (MAA) | 7.50 parts |
| | 100.00 |

The composition and characteristics of the resulting latex II (from which the alcohol was in this instance not removed) are shown in the Table below.

(B) Preparation of Latexes III-V

The procedure of Example 1 and 2 above was repeated, using the following ingredients:

| | Parts | | |
|---|---|---|---|
| | III | IV | V |
| Demineralised water | 28.45 | 27.91 | 28.30 |
| Industrial methylated spirit | 21.66 | 23.53 | 22.73 |
| Methoxy (polyethylene oxide) methacrylate, mol. wt. 2000 (27% solids solution in methylated spirit/toluene) | 9.31 | 9.02 | 9.14 |
| Azodiisobutyronitrile | 0.73 | 0.71 | 0.72 |
| Methyl methacrylate (MMA) | 14.55 | 11.15 | 13.69 |
| Butyl acrylate (BA) | 17.33 | 21.86 | 21.51 |
| Methacrylic acid (MAA) | 7.97 | 5.82 | 3.91 |
| | 100.00 | 100.00 | 100.00 |

The resulting latexes were each diluted with demineralised water and then distilled to remove solvent (mainly ethanol), as follows:

| | III | IV | V |
|---|---|---|---|
| Water added, per 100 g of total latex | 7.22 | 8.23 | 7.25 |
| Solvent distilled off, per 100 g of initial latex | 4.29 | 8.23 | 7.25 |

The composition and characteristics of the resulting latexes III-V are shown in the Table below.

(C) Preparation of latexes VI-IX

The procedures of Examples 1 and 2 above was repeated, using the following ingredients:

| | VI | VII | VIII | IX |
|---|---|---|---|---|
| Demineralised water | 28.30 | 28.30 | 28.30 | 28.30 |
| Industrial methylated spirit | 22.73 | 22.73 | 22.73 | 22.73 |
| Methoxy (polyethylene oxide) methacrylate, mol. wt. 2000 (27% solids solution in methylated spirit/toluene) | 9.14 | 9.14 | 9.14 | 9.14 |
| Azodiisobutyronitrile | 0.72 | 0.72 | 0.72 | 0.72 |
| Methyl methacrylate (MMA) | — | — | — | 16.81 |
| Butyl acrylate (BA) | 14.86 | — | 20.53 | 18.39 |
| Butyl methacrylate (BMA) | 16.42 | — | — | — |
| Vinyl acetate (VA) | — | 18.77 | — | — |
| 2-Ethylhexyl acrylate (EHA) | — | 12.51 | — | — |
| Styrene (S) | — | — | 10.75 | — |
| Methacrylic acid (MAA) | 7.83 | 7.83 | 7.83 | — |

-continued

|  | VI | VII | VIII | IX |
|---|---|---|---|---|
| Acrylic acid (AA) | — | — | — | 3.91 |
|  | 100.00 | 100.00 | 100.00 | 100.00 |

The composition and characteristics of the resulting latexes VI–IX (from none of which was the alcohol removed) are shown in the Table below.

LATEX COMPOSITIONS AND CHARACTERISTICS

|  |  | II | III | IV | V | VI | VII | VIII | IX |
|---|---|---|---|---|---|---|---|---|---|
| Monomer composition of latex polymer, % | MMA | 27.45 | 36.50 | 28.70 | 35.00 | — | — | — | 43.00 |
|  | BA | 53.25 | 43.50 | 56.30 | 55.00 | 38.00 | — | 52.50 | 47.00 |
|  | BMA | — | — | — | — | 42.00 | — | — | — |
|  | VA | — | — | — | — | — | 48.00 | — | — |
|  | EHA | — | — | — | — | — | 32.00 | — | — |
|  | S | — | — | — | — | — | — | 27.50 | — |
|  | MAA | 19.30 | 20.00 | 15.00 | 10.00 | 20.00 | 20.00 | 20.00 | — |
|  | AA | — | — | — | — | — | — | — | 10.00 |
| Solids content of latex, % |  | 42.1 | 42.3 | 40.3 | 41.2 | 42.5 | 38.3 | 41.6 | 42.2 |
| *Tg of latex polymer, °C. |  | 6 | 22 | 0 | 0 | 6 | 7 | 7 | 7 |

*Theoretical glass transition temperatures calculated from the standard values for the constituent monomers but not taking the stabiliser precursor into account.

(D) Preparation of Coating Compositions

The above-described latexes II–IX were each diluted with demineralised water and various additives incorporated, so as to give corresponding sprayable coating compositions 2–9 with the following formulation in each case:

| Latex copolymer | 25.0 parts |
|---|---|
| Sodium dioctylsulphosuccinate (75% solution in methylated spirit) | 0.5 part |
| Acetylenic glycol blend (83% solution in ethylene glycol: "Surfynol" TG ex. Air Products) | 1.0 part |
| Levelling aid ("WRACLA" ex. Paint Chemicals Inc., Chicago, USA) | 0.5 part |
| Ammonia solution, s.g. 0.880 | 0.05 part |
| sec-Butanol | 6.0 parts |
| Demineralised water Industrial methylated spirit Solvent from stabiliser precursor solution | 66.95 parts |
|  | 100.00 parts |

The formulated compositions were in most cases passed through a 200-mesh nylon filter in order to remove traces of coarse particulate matter, but the actual amount of solid material separated was trivial in each case.

Some characteristics of the compositions are given below.

| Composition No. | 2 | 3 | 4 | 5 | 6 | 7a* | 8 | 9 |
|---|---|---|---|---|---|---|---|---|
| Density (Kg/l) | 0.991 | 1.003 | 0.992 | 0.992 | 0.990 | — | 0.992 | 0.994 |
| pH | 6.1 | 6.3 | 6.3 | 6.9 | 6.1 | 5.0 | 5.9 | 5.3 |
| Viscosity (secs, in BS B3 cup at 25° C.) | 27 | 30 | 29 | 27 | 29 | 27 | 27 | 30 |

*Modified formulation, 20% polymer solids content: see below.

(E) Application of the Compositions, and Testing and Removal of the derived Coatings (i) Application The compositions 2–9 were each applied by pouring to glass panels, and by spraying to top-coated steel panels as described in Example 1 above. In all cases except that of composition 8, the resulting films on glass were of good clarity, indicating that the coatings were satisfactorily coalesced. The coatings on steel panels all rapidly developed good resistance to scratching and abrasion. The coatings from compositions 4 and 5 (based on latexes IV and V respectively) were slightly tacky in comparison with the others, this probably reflecting their low Tg values. Compositions 2–6, 8 and 9 all gave on spraying coatings of thickness about 10 μm, similar to that of Example 1. Composition 7 had a higher viscosity than the others and was suitable for application of coatings rather thicker than the normal 10 μm thickness. Such coatings were, not unexpectedly, slower drying than their thinner counterparts, but the added film build can be of advantage where abrasion resistance of the protective coating is of paramount importance, for example in the protection during transit of moulded acrylic baths. For the purposes of comparison with compositions 6, 8 and 9, however, composition 7 was diluted with demineralised water so that its viscosity was similar to that of the other compositions (in the region of 25–30 secs. in a B.S.B3 cup at 25° C.) and the film thickness obtained on spray application was the normal one of about 10 μm. The polymer solids content of the thus diluted composition 7a was about 20%, compared with 25% for the other three compositions, and the additives in the composition were at 80% of their usual levels.

(ii) Stability of the Compositions to Freeze-Thaw and Storage

The compositions 2–5 all exhibited excellent stability to seven successive freeze-thaw cycles from room temperature down to a minimum of −25° C. No settlement, separation or flocculation of the polymer was observed in these tests. The stability of these compositions to three months' storage at 40° C. was also good in every case, there being no significant settlement of solids or formation of lumps. A repetition of the application of the compositions to glass and painted steel panels after these freeze-thaw and storage tests showed no deterioration of properties to have occurred. Other properties of the compositions, viz. density, pH value and viscosity showed negligible or no change after the freeze-thaw test and the three months' storage test.

Compositions 6, 8 and 9, and original composition 7, all exhibited excellent stability to four successive freeze-thaw cycles down to a minimum temperature of −25° C. No settlement or flocculation was observed. The modified composition 7a exhibited a bottom sediment of about 5% of the total depth of the sample after four such cycles, but its other properties (density, pH, viscosity) were unaffected. Storage of compositions 6, 8 and 9 at 40° C. for 4 days produced no settlement of solids or lumps; the same test on composition 7a gave rise to some small lumps at the bottom of the sample.

(iii) Demineralised Water Soak Test

For this test, the compositions 2-5 were each applied to steel panels coated with a thermosetting acrylic top-coat paint, using a conventional air-atomisation spray gun so as to obtain a dry film thickness of 10 μm. The coatings were allowed to become dry to the touch in the spray booth at 20°–25° C. After 1 minute more at that temperature, the panels were immersed in demineralised water at 20°±2° C. and the behaviour of the coating then observed. The test was considered to be passed if there was no blistering or loss of adhesion of the coating to the substrate within 30 minutes of the initial immersion (slight water-whitening or softening, which disappeared on removal of the panels and drying, was discounted). If a coating failed to pass this test, the procedure was repeated with a fresh coated panel allowing a 10-minute period between touch-dry and immersion. In the event that a 'fail' result was still obtained, the procedure was again repeated, allowing the touch-dry panel to stand overnight before immersion.

In the above-described test, the coatings from compositions 2, 4 and 5 passed after only 1 minute's "ageing", and this result was reproduced after each of the compositions had been subjected to the freeze-thaw and the three months' storage tests. The coatings from composition 3 required ageing overnight in order to pass the test. However when the experiment was repeated with the preliminary addition to composition 3 of 1% by weight of propylene glycol monomethyl ether as coalescing solvent, a test of water-soak resistance 1 minute after touch-dry gave a much improved result: only about 5% of the immersed area of the film showed microblistering and overall adhesion of the film to the substrate whilst wet was good. In comparison, under the same test conditions, composition 3 without the coalescing solvent addition showed blistering all over the immersed area and adhesion was poor. These results were probably attributable to the relatively high Tg (22° C.) of the polymer of composition 3 and a correspondingly lower inherent capability for coalescence of the polymer particles. The improved performance with composition 3 was reproduced when the coalescing solvent was added to a further sample of the composition which had been stored at 40° C. for 3 months.

The compositions 6, 7a, 8 and 9 were subjected to the water soak test in the same manner. The coatings from compositions 6, 7a and 9 passed after only 1 minute's "ageing" and this result was reproduced after the compositions had been subjected to 4 freeze-thaw cycles. The coating from composition 8 required ageing overnight in order to pass the test, but somewhat less effective coalescence than in the other compositions was indicated here by the hazy appearance of the film obtained by pouring on to glass and the matt appearance of the coating applied by spray to the top-coat painted panels. When 1% of propylene glycol monomethyl ether was added to composition 8 (to give composition 8a) before spraying, the gloss of the coating was greater and the water soak test performance much improved, only slight microblistering being observed after 1 hour's immersion beginning 1 minute after touch-dry and no blistering at all after 4 hours' immersion beginning 2 hours after touch-dry.

(iv) Weathering and Removal of the Coatings from the Substrates

In the following tests, the compositions employed were compositions 2,4,5,6,7a,8a and 9 as described above, together with a slight modification of composition 3 (identified hereinafter as composition 3a). Composition 3a was based on latex III but the latex was not distilled to remove solvent, and in making up the composition according to the general formulation given above there was additionally included 2 g of propylene glycol monomethyl ether for each 100 g of composition.

Compositions 2,3a,4 and 5 were spray-applied to steel panels coated with a medium-solids thermosetting polyester automobile top-coat paint. The panels were exposed to exterior weathering for 3 months in a light industrial environment, after which period the temporary protective coatings were still fully intact and abrasion- and weather-resistant.

Removal of the temporary coatings from the panels was effected by pouring on to them at room temperature an aqueous solution containing 1% by weight of sodium hydroxide, 4% of isobutanol and 1% of a cellulose ether as thickener. After this solution had remained in contact with the coatings for 1 minute, the panels were washed in a jet of cold water. Inspection of the panels after drying showed complete removal of the coating derived from composition 4; the coating from composition 2 left a very slight residue which was rubbed off easily with a damp tissue. The coatings derived from compositions 3a and 5 left small areas unremoved after this treatment, but these were readily got rid of by light action of a soft brush whilst rinsing with water. No damage to the polyester top-coat paint was detected after removal of the coatings from any of these compositions.

Compositions 6, 7a, 8a and 9 were spray-applied to steel panels coated with a thermosetting acrylic automobile top-coat paint. After exterior weathering in a light industrial environment for 6 days in the case of the coatings from compositions 6 and 7a and 3 days in the case of those from compositions 8a and 9, the coatings were all found to be easily removable by the procedure described above. The acrylic paint thus exposed had been unaffected by the process.

(v) Accelerated Weathering Test and Removal of Coatings

The coating compositions 2, 3a, 4 and 5 were each applied by spray to steel panels coated with a number of different automobile topcoat paints, namely (a) a thermosetting alkyd/melamine type, (b) a thermosetting medium solids polyester type, (c) a polyester basecoat carrying a thermosetting acrylic clearcoat. All these panels were exposed on a "Marr" accelerated weathering machine for 1000 hours (each 12-hour cycle comprising exposure to a 1600-watt enclosed carbon arc for 10 hours under wet conditions followed by 2 hours under dry conditions). After exposure, all the temporary coatings were found to be intact and reasonably smooth. Treatment with removal solutions as described in (iv) above, the solution being allowed to remain in contact with the coating for 5 minutes before rinsing with water, resulted in complete removal of all the temporary coatings and no deterioration in appearance of the underlying paint surfaces was detected.

COMPARATIVE EXAMPLES 10–13

A coating composition 10 was prepared following the formulation given in part (D) of Examples 2–9 above, but replacing the latex II by a charge-stabilised latex, of solids content 46.2%, obtained by conventional aqueous emulsion polymerisation of a monomer mixture of similar composition to that used in making latex II. It was found, however, that the inclusion of sec-butanol in the formulation caused instability of the composition, manifested by a rapidly increasing content of coagulated particles ('bits'); replacement of the sec-butanol by decanol gave no improvement.

A composition 11 was therefore prepared similarly, but omitting all coalescent solvent from the formulation. When applied to steel panels and submitted to the demineralised water soak test, as described in part (E)-(iii) above, composition 10 passed the test after 1 minutes' ageing, but composition 11 gave an inferior result to that given by composition 2, based on latex II; the test was failed both 1 minute and 10 minutes after touch-dry, although it was passed after overnight ageing. The performance of composition 10 was equalled by a composition 12 from which both the coalescent solvent and the ammonia were omitted, but this composition had an undesirably low pH (3.6). The viscosities of compositions 10, 11 and 12 were all lower than that of composition 2, being in the range 19–21 secs. (B.S. B3 cup at 25° C.) and, in consequence were found to give rise to extensive sagging when they were spray-applied at a delivery rate designed to give a 10 μm dry film thickness; sagging could only be avoided by applying thinner films, which were inadequate to give the required degree of protection to the paint underneath. All these films had the additional defect of exhibiting 'bits'.

Addition of further ammonia to composition 12 gave a composition 13 having pH similar to that of composition 2 and a slight improvement in the tendency to sag was then observed, but the application characteristics were still inferior to those of composition 2 and the water soak test result deteriorated to that given by composition 11. In addition, increased instability of the composition 13 was evident from the extremely 'bitty' appearance of the applied films.

Some characteristics of compositions 10–13 are shown below.

| Composition No. | 10 | 11 | 12 | 13 |
|---|---|---|---|---|
| pH | 5.1 | 4.9 | 3.6 | 6.3 |
| Viscosity (secs, in B.S. B3 cup at 25° C.) | 21 | 19 | 19 | 19 |

COMPARATIVE EXAMPLE 14

A coating composition 14 was prepared similarly to composition 10 described above, except that the charge-stabilised latex upon which it was based had a somewhat lower solids content (41.5%); the monomer composition of the latex polymer was the same as in composition 10.

When subjected to the freeze-thaw test as described in part E(ii) of Examples 2–9, composition 14 failed owing to flocculation of the polymer after only one cycle down to −25° C. On return to room temperature, the sample had flocculated completely, with the separation of a clear aqueous layer.

After storage for 3 months at 40° C., composition 14 was seen to have a flaky sediment on the bottom of the container; it had also become extremely 'bitty' and contained some stringy polymer coagulum which had to be removed before the material could be passed through a spray gun. The same coagulation effect was observed even on storage for 2 months at room temperature.

The resistance of composition 14 to freeze-thaw cycling was somewhat improved when sufficient ammonia solution was added to it to bring its pH up from the original level of 4.7 to a neutral or slightly alkaline level. At pH 6.7–6.8, it withstood 3 cycles without completely flocculating, although it had become very 'bitty' and lumpy. At pH 7.5, it was unflocculated after 3 cycles, although the film obtained by pouring on to glass exhibited some 'bits'. However, the composition adjusted to pH 7.5 was very high in viscosity and gave films having extremely poor water resistance; the water soak test was failed after only 30 minutes' immersion even after the films had aged overnight.

Composition 14 was also applied to painted panels and subjected to the accelerated weathering test, as described in part E(v) of Examples 2–9. After exposure, the temporary coating was seen to be wrinkled, indicating loss of adhesion to the substrate. On treatment with removal solution, residues of the coating remained on all the topcoat surfaces, which conseqently had a blotchy appearance. Further application of removal solution, and even heavy brushing during rinsing (which resulted in damage to the underlying paint), did not achieve complete removal of these residues.

We claim:

1. An aqueous composition suitable for the production upon a substrate of a temporary protective coating which can subsequently be removed by treatment with an aqueous alkaline solution, the composition comprising a sterically stabilized dispersion in an aqueous medium of particles of a size in the range 0.1 to 10 microns of a polymer derived from a monomer mixture comprising (1) at least one acrylic monomer selected from the group consisting of alkyl esters, nitriles and amides of acrylic acid and methacrylic acid and from 5 to 40%, based on the, total weight of (1) and (2), of (2) an ethylenically unsaturated monocarboxylic acid, or a proportion equivalent thereto, in terms of carboxyl group content, of an ethylenically unsaturated polycarboxylic acid, the said dispersion being obtained by free radical-initiated polymerization of (1) and (2) in an aqueous medium which is a mixture comprising (a) at least 30% by weight of water and (b) not more than 70% by weight of a second constituent which is miscible with water, the nature and proportion of the second constituent being such that the aqueous medium as a whole is capable of dissolving (1) and (2) to the extent of at least 3% by weight but is a non-solvent for the polymer formed, the polymerization being carried out at a temperature which is at least 10° C. higher than the Tg (glass-rubber transition temperature) of the polymer, there being introduced into the reaction mixture, before the polymerization begins, a steric stabilizer precursor which is the acrylic or methacrylic ester of a polyethylene glycol, or a monoalkyl ether thereof, of molecular weight in the range 1500 to 4000, the concentration of free monomer in the polymerization mixture being maintained throughout at a level such that at no time does the free monomer form a separate phase.

2. A composition as claimed in claim 1, which contains from 5% to 25% by weight of an ethylenically unsaturated monocarboxylic acid, or an equivalent proportion of an unsaturated polycarboxylic acid.

3. A composition as claimed in claim 2, which contains from 10% to 20% by weight of an ethylenically unsaturated monocarboxylic acid, or an equivalent proportion of an unsaturated polycarboxylic acid.

4. A composition as claimed in claim 1, wherein the second, water-miscible constituent of the aqueous medium is ethanol.

5. A composition as claimed in claim 1, wherein the temperature of polymerisation of the monomer mixture is at least 20° C. higher than the Tg of the polymer which is formed.

6. A composition as claimed in claim 5, wherein the temperature of polymerisation is at least 30° C. higher than the Tg of the polymer formed.

7. A composition as claimed in claim 1, wherein the proportion of stabiliser precursor is from 0.5% to 20% by weight of the polymer content of the dispersion.

8. A composition as claimed in claim 1 having a polymer solids content of about 25% by weight.

9. A composition as claimed in claim 1, wherein the carboxylic acid groups in the polymer of the dispersion are neutralised wholly or in part by addition of a water-soluble amine.

10. A composition as claimed in claim 9, having a pH value in the range 6-7.

11. A process for the production upon a substrate of a temporary protective coating which can subsequently be removed by treatment with an aqueous alkaline solution, which comprises applying to the substrate a composition as claimed in claim 1 and allowing the composition to dry.

12. A substrate upon which a temporary protective coating has been produced by a process as claimed in claim 1.

* * * * *